June 19, 1951     I. R. WENNER     2,557,623

ELEVATOR

Filed Sept. 17, 1946     2 Sheets-Sheet 1

INVENTOR.
BY IRA R. WENNER
Oldham & Oldham
attorneys

June 19, 1951     I. R. WENNER     2,557,623
ELEVATOR
Filed Sept. 17, 1946          2 Sheets-Sheet 2
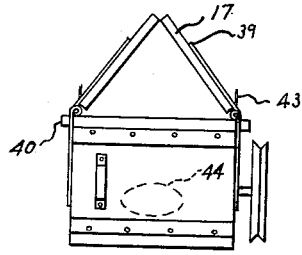
FIG. 4
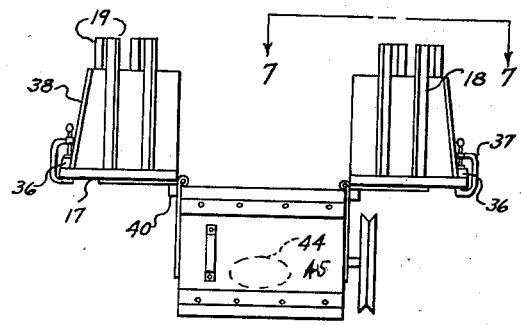
FIG. 6
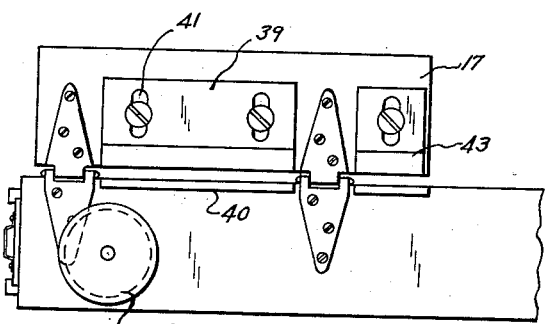
FIG. 5
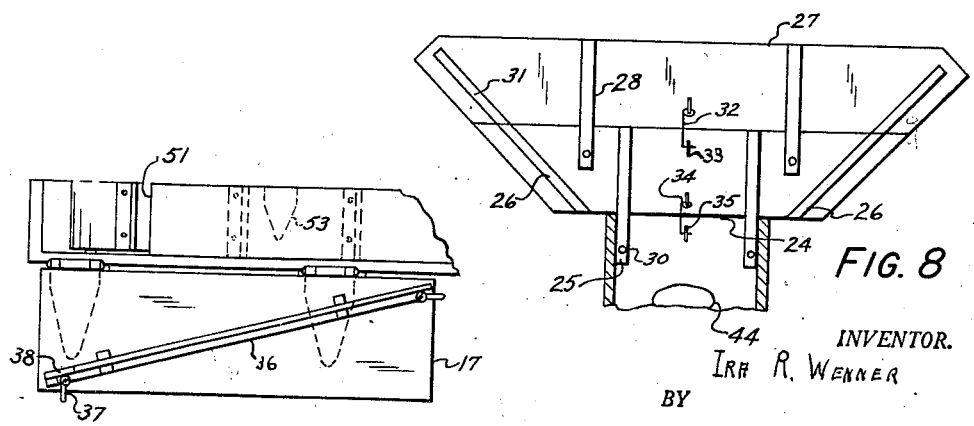
FIG. 7
FIG. 8
INVENTOR.
IRA R. WENNER
BY
Oldham & Oldham
Attorneys Patented June 19, 1951

2,557,623

UNITED STATES PATENT OFFICE 2,557,623

ELEVATOR

Ira R. Wenner, Sycamore, Ohio

Application September 17, 1946, Serial No. 697,477

8 Claims. (Cl. 198—53)

This invention relates to elevators, especially to portable elevators of the conveyor type, which elevators are adapted to convey corn, grain or other small articles from a storage point to a discharge point.

Heretofore, there have been various types of small, portable elevators provided for moving quantities of small articles from one place to another and these conveyors are frequently used for loading wagons and trucks with farm produce. These conveyors usually comprise a frame in which an endless conveyor belt is journalled. The belt carries a plurality of buckets and means are associated with the conveyor mounting means for connecting to driving means, such as a driving belt. The conveyors usually are mounted on a pair of rollers at one end to facilitate transporting the conveyor and that end of the conveyor would be the lower, or receiving end of the conveyor and be provided with a relatively large three-sided hopper secured thereto. This hopper aids in feeding the conveyor but limits its usefulness in several ways. For example, the hopper is of such size as to prevent its entry into a corn crib or other comparable storage compartment of limited size, and the size of the hopper is such that it cannot be placed on the outside of a ground level storage bin and have substantially the entire contents of the bin empty out automatically into the conveyor and its hopper. Instead, hand transfer of an appreciable amount of the contents of the bin would be required in order to load same onto the elevator.

The general object of this invention is to avoid and overcome the foregoing and other disadvantages of and objections to known types of elevators and to provide an elevator which is characterized by its ready adaptability to given loading conditions and by its low height loading station.

Another object of the invention is to provide a novel, useful, improved elevator for general farm use.

A further object of the invention is to provide a portable elevator which has a plurality of removable load guiding members which can be assembled in a plurality of positions on an elevator dependent upon the given load conditions.

Another object of the invention is to provide an elevator that is adapted to receive load from a storage compartment with a minimum of hand transfer of the load to the elevator.

A further object of the invention is to provide an elevator for use in transporting small articles, which can easily be cleaned out of the elevator, when desired.

The foregoing, and other objects and advantages of the invention, will be manifest as the specification proceeds.

Attention now is directed to the accompanying drawings, wherein:

Fig. 4 is an end elevation of the conveyor of the invention showing the hopper sections secured thereto in their retracted positions;

Fig. 5 is a side elevation of the load receiving end of the elevator as shown in Fig. 4;

Fig. 6 is an end elevation of the load receiving end of my elevator with the hopper sections in an alternative position;

Fig. 7 is a fragmentary plan of the elevator taken on line 7—7 of Fig. 6;

Fig. 8 is an elevation, partly in section, of the rear hopper sections mounted on the conveyor frame; and Fig. 9 is a fragmentary plan of a further modification of the invention.

Figure 2:
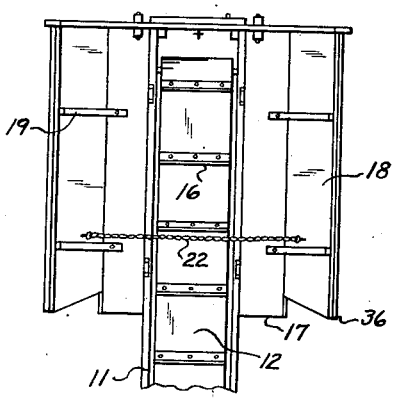
Fig. 2 is a plan of the hopper end of the elevator.

Referring in detail to the structure shown in the accompanying drawings, an elevator 10 is shown which elevator comprises an open-centered substantially rectangular frame 11 which journals an endless belt or drag member 12 therein by a roller 13 which is suitably journalled in the lower part of the frame 11 and a similar roller (not shown) in the upper portion of the frame. The roller 13 has a shaft 14 extending therefrom through the frame 11 and it carries a pulley 15 which is adapted to engage with any conventional means for driving the belt 12. Suitable slats or load carriers 16 are secured to the belt 12 in a conventional manner to form load carrying portions thereon although other types of carriers may be used. The elevator 10 can be transported by and positioned on or by any suitable means when in operation.

A primary feature of the invention is that the lower portion of the frame 11, which is the load receiving portion of the elevator and which is of low height, has only a pair of flat, rectangular hopper sections 17 permanently and pivotally secured to the upper edges of opposite sides of the frame. Thus, that end of the elevator can be placed on the ground, or even in a small hole dug in the ground, adjacent a corn crib or the like and then by removing a slat or two of the crib substantially the entire contents of that portion of the crib will fall by gravity into the elevator, being guided, usually, by the hopper sections.

Figures 1, 3:
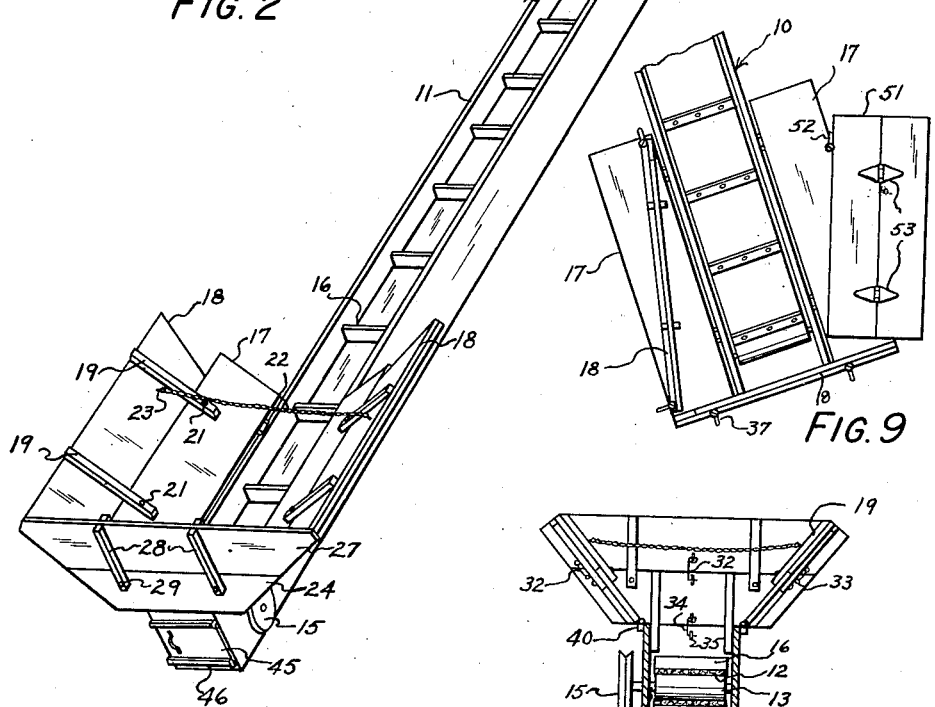
Fig. 1 is a perspective view of an elevator embodying the principles of my invention.
Fig. 3 is a vertical, transverse section of the conveyor and hopper taken adjacent the lower end of such member in a direction towards the lower end of same.

Fig. 1 of the drawings shows the hopper sections 17 with substantially rectangular extension sections 18 removably secured thereto by means of opposed pairs of arms 19 secured to opposite sides of the sections 18 and extending therefrom so that they fit snuggly over the edges of the sections 17. Then, if desired, the assembly may be made more secure by forming aligned holes through the arms 19 and sections 17 and placing bolts 21 through such holes but in all events, the sections 18 can rapidly and readily be assembled, or disassembled. A reenforcing chain 22 may also be removably secured to and extend between hooks 23 secured to the sections 18. The bottom end of the hopper which can be formed by removable members on the lower end of the elevator 10 is made of a base section 24 which is of substantially trapezoidal shape and has a pair of arms 25 secured thereto and extending therefrom for engagement with the inner surface of the end of the frame 11. If desired, the arms 25 may be removably secured in a suitable manner as by bolts 30 to the end of the frame 11. Positioning braces 26 are suitably secured to the inner surface of the base section 24 and extend upwardly and outwardly of the elevator to form rests to engage the end portions of the sections 17 to aid in positioning the hopper sections 17 at an angle to the frame 11.

A base extension section 27, also of trapezoidal shape may be secured to the base section 24 by spaced pairs of arms 28 suitably secured to opposite faces of the section 27 and extending from the smaller length edge for engaging with the section 24 and being removably secured thereto by bolts 29. Braces 31, which form continuations of the braces 26, are secured to the inner surface of the section 27 adjacent the ends thereof and aid in positioning the extension sections 18. Hooks 32 may be secured to the base section 27 at the ends and mid-section thereof to engage with eyes 33 carried by the end portions of the extension sections 18 and the upper center portion base section 24, respectively. A hook 34 carried by the base section 24 engages an eye 35 on the frame 11. Thus, a hopper of sturdy construction can be formed on the elevator 10 from a plurality of separate sections and be used for load receipt and guiding purposes in the customary manner but still the hopper can be altered to fit different loading conditions, or even could be used with no hopper sections thereon except the small sections 17.

Fig. 6 shows a reassembly of the extension sections 18 on the hopper sections 17 which is useful in many instances. Each of the extension sections 18 has a foot or bracket 36 suitably secured thereto at one edge thereof and these brackets 36 are flush with the edges of the sections so that the sections 18 can be stood on their edges on the hopper sections 17 with the brackets 36 flush against the hopper sections, which position is shown in Fig. 6. Then any conventional devices, in this instance clamps 37, are used to secure the extension sections to the hopper sections in a removable manner. Fig. 7 clearly brings out that the ends of the sections 18 are inclined inwardly from their base ends at the end of the frame 11 towards their upper ends while Fig. 6 shows that edges 38 of the extension sections 18 are cut off at an acute angle with the base edge of the sections whereby the elevator unit may be at an appreciable vertical angle and be moved up against a storage bin without hitting the sections 18 against such a bin. The hopper sections 17 are retained in their horizontal positions (Figs. 6 and 7) by suitable members such as a plurality of stop members 40 that are secured to the outer surfaces of the frame.

In using the elevator 10 in a narrow space, such as a corn crib aisle, the elevator is of such a width that the hopper sections 17 must be folded in on the frame 11 to get the elevator into the crib. Then a small hopper unit of sections 17 and 24 could be assembled on the elevator, if desired, or the load guide structure shown in Figs. 6 and 7 could be made for use in automatically loading and conveying a maximum of material from the storage bin.

Obviously, small cracks are formed between the upper edges of the frame 11 and the hopper sections 17 as they are moved to vertically upwardly extending positions on their hinges. To close this crack, metal plates 39 having parallel, transversely directed slots 41 formed therein are secured to the under surfaces of the hopper sections by screws 42, or other suitable means, so that the plates 39 can be adjusted on the sections 17 to fill the crack between the sections 17 and the frame. An inner edge 43 of each plate 39 may be bent back on the plate to form an enlarged edge section to aid in filling the edge crack referred to above. The plates 39 may be formed in sections, if desired, as shown.

A hole 44 may be formed in the lower end of the frame to aid in cleaning the load carrying foot of the frame, such as when one changes items being transferred by the elevator. A cover plate 45 is slidably mounted in guides 46 for movement to and from a closure position. The cover plate 45 may be frictionally engaged with the guides so as to be retained in any given position.

Fig. 9 shows a modification of the elevator of the invention which is especially useful with storage bins that are difficult to approach due to being near other buildings, on a hill, or for other reasons and must be loaded onto the elevator 10 from its side. In this instance, one extension section 18 is secured at the end of the elevator extending between the sections 17 and being secured to such sections 17, for example, by the clamps 37 that engage with the brackets 36 and the sections 17. Then a flat rectangular member 51 may also be secured to the section 17 adjacent the corn crib or other storage bin to aid in transferring load to the elevator 10. Any suitable means, such as a clamp 52 similar to the clamps 37, may be used to temporarily secure the member 51 in position. The member 51 preferably is formed of two longitudinally split sections that are secured together by hinges 53, which permit pivotal movement of the sections only in the direction which will bring the hinge sections into contacting, superimposed positions. Fig. 9 shows that the member 51 is as wide as the elevator itself and this provides a further use for such member. To prevent overloading the elevator, the member 51 can be placed over the top surface of the elevator where it is being loaded so as to expose only a small area thereof for load receipt, as shown in Fig. 7. The member 51 is turned over for its load distributing function shown in Fig. 7. Should the member 51 be wider than the elevator, it can be folded in on its hinges slightly and then be arched over the elevator.

Obviously, the pivotally mounted hopper sections could be carried by any type of frame member, such as one having outwardly flaring sides, as well as by the type of frame shown herein.

The elevator and hopper units likewise may be made of any suitable materials with rust proof sheet metal usually being used in forming the frame and hopper sections, although they may be made from wood and other materials, when desired. A chain or other reenforcing member may be secured between the hopper sections 17 to retain them at an inclined position should they be used without the base section 24.

In all events, a portable elevator which is adapted to have no, or any of a plurality of different sized hoppers formed thereon, is provided; which various hoppers may be readily and easily individually formed on the elevator. Also, though movable, the hoppers are of sturdy construction and well adapted to carry loads placed thereon. Thus, an elevator fulfilling the objects of the invention is provided.

While in accord with the patent statutes I have specifically illustrated and described one embodiment of my invention, it should be understood that the invention is not limited thereto or thereby but that the scope of the invention is defined in the appended claims.

What is claimed is:

1. A portable elevator comprising an open centered rectangular frame, an endless conveyor having load carrying means secured thereto journalled in said frame, substantially rectangular hopper sections, means pivotally securing said hopper sections to the upper edges of said frame adjacent one end thereof, a base section removably positioned on the end of said frame and extending upwardly therefrom, brace means secured to the inner surface of said base section adjacent the ends thereof and extending upwardly and outwardly of said frame, said brace means engaging with the end portions of said hopper sections to position them at an angle to said frame, extension sections having at least one pair of opposed arms secured to the opposite faces thereof and extending therefrom to engage with said hopper sections with the extension sections forming continuations thereof, means extending through said arms and said hopper sections to secure said extension sections thereof, a base extension having at least one pair of opposed arms secured to the opposite faces thereof and extending therefrom to engage with said base section, means extending through said arms and said base section to secure said base section removably thereto with said base extension section lying flush with and as a continuation of said base section, braces carried by said base extension section and being adapted to aid in positioning said extension sections, reenforcing means extending between said extension sections, and means for removably securing said base extension to said extension sections.

2. A portable elevator comprising an open centered frame, an endless conveyor having load carrying means secured thereto journalled in said frame, substantially rectangular hopper sections, means pivotally securing said hopper sections to said frame adjacent one end thereof, a base section removably positioned on the end of said frame and extending upwardly therefrom, brace means secured to the inner surface of said base section adjacent the ends thereof and extending upwardly and outwardly of said frame, said brace means engaging with said hopper sections to position them at an angle to said frame, extension sections having at least one pair of opposed arms secured to the opposite faces thereof and extending therefrom to engage with said hopper sections with the extension sections forming continuations thereof, a base extension having at least one pair of opposed arms secured to the opposite faces thereof and extending therefrom to engage with said base section, braces carried by said base extension section and being adapted to aid in positioning said extension sections, reenforcing means extending between said extension sections, and means for removably securing said base extension to said extension sections.

3. A portable elevator comprising an open centered frame, an endless conveyor having load carrying means secured thereto journalled in said frame, substantially rectangular hopper sections, means pivotally securing said hopper sections to the upper edges of said frame adjacent one end thereof, a base section removably positioned on the end of said frame and extending upwardly therefrom, brace means secured to the inner surface of said base section adjacent the ends thereof and extending upwardly and outwardly of said frame, said brace means engaging with said hopper sections to position them at an angle to said frame, extension sections having at least one pair of opposed arms secured to the opposite faces thereof and extending therefrom to engage with said hopper sections with the extension sections forming continuations thereof, a base extension having at least one pair of opposed arms secured to the opposite faces thereof and extending therefrom to engage with said base section, said base extension section being adapted to lie flush with and as a continuation of said base section, and braces carried by said base extension section and being adapted to aid in positioning said extension sections.

4. In a portable elevator, a rectangular frame, an endless conveyor journalled in said frame, an extension section pivotally secured to the upper edge of each side of said frame at one end thereof to form guides for feeding items to be carried by the elevator onto same, means for retaining said extension sections at an angle to said frame, auxiliary extension sections having brackets extending perpendicularly from one edge thereof and being positioned on said extension sections with said brackets lying flush against same, and means for removably securing said auxiliary extensions to said extensions to aid in feeding items onto the conveyor, each of said auxiliary extensions also being provided with at least one pair of opposed arms secured to opposite side thereof and extending therefrom for engagement with said extensions whereby said auxiliary extensions can alternately be removably associated in edge to edge abutting relationship with said extensions to form continuations of same.

5. In a portable elevator for general farm use and adapted to have a low loading level, a rectangular frame for supporting load transmitting means, extension sections, means pivotally securing one of said extension sections to the upper edge of each side of said frame at one end thereof to form guides for feeding items to be carried by the elevator onto same, auxiliary extension sections having foot means extending substantially perpendicularly from one edge thereof and being positioned on said extension sections with said foot means lying flush against same, and means for removably securing said auxiliary extension sections to said extension sections to aid in feeding items onto the elevator, each of said auxiliary extension sections having an edge surface complementary to an edge of said extension sections for being positioned in edge to edge abutting relationship to form continuations of said extension sections.

6. In a portable elevator, a rectangular frame, an endless conveyor journalled in said frame, a hopper section pivotally secured to the upper edge of each side of said frame at one end thereof to form guides for feeding items to be carried by the elevator onto same, auxiliary extension sections having foot means extending substantially perpendicularly from one edge thereof and being positioned on said hopper sections with said foot means lying flush against same, and means for removably securing said auxiliary extension sections to said hopper sections to aid in feeding items onto the conveyor, said auxiliary extensions having inclined end surfaces at the end of said frame whereby the elevator can be positioned immediately adjacent and at an angle to a storage compartment with said auxiliary extensions being adapted to bear against or be immediately adjacent the storage compartment without materially limiting the position of the elevator.

7. In a portable elevator, a substantially rectangular frame, an endless conveyor journalled in said frame, a hopper section pivotally secured to the upper edge of each side of said frame at one end thereof to form guides for feeding items to be carried by the elevator onto same, auxiliary extension sections having foot means extending substantially perpendicularly from one edge thereof and being positioned on said hopper sections with said foot means lying flush against same, and means for removably securing said auxiliary extension sections to said hopper sections in substantially normal relation thereto to aid in feeding items onto the conveyor, said auxiliary extensions also having clamp means associated therewith for being secured to said hopper sections to form extensions thereof.

8. A portable elevator comprising an open centered frame having sides and an end, an endless conveyor journalled in said frame, a plurality of hopper sections pivotally secured to the outer surface of the sides of said frame adjacent one end thereof and adapted to extend upwardly therefrom, a base section associated with the end of said frame to provide the elevator with a substantial size hopper the sections of which can be removed or folded up adjacent to the lateral margins of said frame, guard plates having transversely directed slots formed therein, and means adjustably engaging with the slots to secure said guard plates to the under surfaces of said hopper sections whereby said guard plates can be adjusted to be associated with the inner edges of said hopper sections to fill the hinge crack between them and said frame.

IRA R. WENNER.

REFERENCES CITED

The following references are of record in the file of this patent:

UNITED STATES PATENTS

| Number | Name | Date |
|---|---|---|
| 290,050 | Hasselman | Dec. 11, 1883 |
| 498,028 | Reeves | May 23, 1893 |
| 620,232 | Dingee | Feb. 28, 1899 |
| 993,737 | Thurman | May 30, 1911 |
| 1,104,738 | Schuman | July 21, 1914 |
| 1,165,460 | Steele | Dec. 28, 1915 |